US012380383B2

(12) United States Patent
Garg et al.

(10) Patent No.: US 12,380,383 B2
(45) Date of Patent: Aug. 5, 2025

(54) ROUTE STACKING IN A FLEET ROUTING SYSTEM

(71) Applicant: ZUM SERVICES, INC., Redwood City, CA (US)

(72) Inventors: Abhishek Garg, Redwood City, CA (US); Rohit Jain, Redwood City, CA (US); Sidi Liu, Redwood City, CA (US); Andrew Mormysh, Redwood City, CA (US); Gustavo Ocasio, Redwood City, CA (US); Melissa Shiu, Redwood City, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/211,404

(22) Filed: Jun. 19, 2023

(65) Prior Publication Data

US 2024/0420044 A1  Dec. 19, 2024

(51) Int. Cl.
*G06Q 10/0631* (2023.01)
*G01C 21/36* (2006.01)
(Continued)

(52) U.S. Cl.
CPC ... *G06Q 10/06312* (2013.01); *G01C 21/3667* (2013.01); *G06Q 50/40* (2024.01); *G08G 1/22* (2013.01)

(58) Field of Classification Search
CPC ........... G06Q 10/063116; G06Q 10/06; G06Q 10/063114; G01C 21/3438; G01C 21/3484; G06N 20/20; H04M 3/5175; H04M 15/8061
See application file for complete search history.

(56) References Cited

U.S. PATENT DOCUMENTS 9,562,785 B1 * 2/2017 Racah .............. G06Q 10/06315
2020/0292337 A1   9/2020 Starns
(Continued)

FOREIGN PATENT DOCUMENTS

CA      3035241 A1 *  8/2019  ......... G01C 21/3438
CN    107810386 A  *  3/2018  ............. G01C 21/32
(Continued)

OTHER PUBLICATIONS

Y. Wang, et al. "Reassignment Algorithm of the Ride-Sourcing Market Based on Reinforcement Learning," IEEE Transactions on Intelligent Transportation Systems, doi: 10.1109/TITS.2023. 3274636 [online], [retrieved on Sep. 6, 2023]. <https://ieeexplore.ieee.org/document/10128792?source=IQplus> (Year: 2023).*
(Continued)

*Primary Examiner* — Jerry O'Connor
*Assistant Examiner* — Michael R Koester
(74) *Attorney, Agent, or Firm* — Kilpatrick Townsend & Stockton LLP

(57) ABSTRACT

A system and method include a device associated with a user. The device may identify to a server computer a route to be reassigned from a first vehicle to a second vehicle among a fleet of vehicles. The server device may include an artificial intelligence engine which compares the route to be reassigned to a plurality of route groups associated with one of the administrator and the ride requestor. The server device may further identify one or more route groups which are able to service the route to be reassigned based on the artificial intelligence engine. The server device may transmit a graphical representation of one or more of the plurality of route groups which is proximally available in terms of location and time, as determined by the artificial intelligence engine to service the route to be reassigned with a color coded indicator. The server device reassigns the route.

12 Claims, 7 Drawing Sheets

(51) Int. Cl.
  *G06Q 50/40* (2024.01)
  *G08G 1/00* (2006.01)

(56) References Cited

U.S. PATENT DOCUMENTS

2021/0248704 A1* 8/2021 Wang .................... G06Q 50/40
2022/0357171 A1  11/2022 Pedersen
2022/0381568 A1  12/2022 Chase et al.
2023/0245044 A1* 8/2023 Sun ..................... G06Q 10/083
                                                         705/28

FOREIGN PATENT DOCUMENTS

JP   2020056683 A   4/2020
KR    102104271 B1  4/2020

OTHER PUBLICATIONS

J. Wang, et al. "Routing school bus for better student learning," 2017 25th International Conference on Geoinformatics, Buffalo, NY, USA, 2017, pp. 1-7, doi: 10.1109/GEOINFORMATICS.2017.8090947 https://ieeexplore.ieee.org/document/8090947?source=IQplus (Year: 2017).*
Translation of CN-107810386-A (Year: 2018).*
PCT/US2024/032799 , "International Search Report and Written Opinion", Sep. 24, 2024, 10 pages.

* cited by examiner

FIG. 5

ROUTE STACKING IN A FLEET ROUTING SYSTEM

TECHNICAL FIELD

The present application discloses a system for routing a fleet of vehicles, scheduling stops, and optimizing those routes and stops based on one or more elements of primary concern. In particular, the present application teaches a system with the ability to optimize vehicle efficiency by combining routes for already utilized vehicles.

BACKGROUND

The earliest advent of a fleet of vehicles likely dates back to antiquity when vehicles became necessary for the transport of people and goods. Fleets of boats are known to have existed in ancient Greece while fleets of chariots were known to have been used in ancient wars both as vehicles of war and as transport vehicles for soldiers and supplies. Even horses themselves have been used for the purpose of transporting people and goods. Indeed, many ancient stories of certain battles turn on the use of fleets of vehicles and their relative coordination in both timing and goals to the win or loss of a battle.

In the more recent past, trains, sail powered boats, and ocean liners were assembled into fleets for both military and civilian use. Since trips across continents or across oceans were typically of an extended duration, schedules and stops for these vehicles, especially in the context of civilian use, were published well in advance of an actual date of embarkation. These dates and schedules were largely accurate given the need to be at a next stop or location in a certain amount of time. Many ocean liners, for example, stopped in multiple ports to pick up passengers and goods before transporting both across the ocean. Trains kept a specific schedule on a time duration basis. For example, a train may leave from Paris for Berlin every other day allowing time for a day to make the trip from Paris to Berlin and a day to make the trip back. At the same time, other trains may have traveled from Trenton, New Jersey to New York City, New York several times per day. Historically, these schedules were based on the number of vehicles available and on the travel time necessary for trips between stops.

The advent of the modern automobile changed transportation all across the world on seemingly an overnight basis, at least in retrospect. Motorized land based transportation without the aid of rails made automobiles the transport method of choice for anything that was not too heavy or far away. Trucks could easily carry people and goods over short distances with very little notice, which was a major development for transportation. Buses became the vehicle of choice for transporting people as buses were fitted with seats for people. Trucks became the vehicle of choice for transporting goods from one place to another. As the relative prices of automobiles decreased and World Wars broke out, automobile fleets came into existence. Fleets of buses took passengers to places where rails did not exist while fleets of trucks took goods from boats in the harbor to soldiers fighting inland.

Fleet logistics became an issue of major importance to military and civilian fleet owners alike. It became imperative to ensure that certain vehicles were available for certain transportation tasks on a periodic basis, whether that basis was a multiple times per day basis, a day to day basis, a weekly basis, or some other periodic basis. Automobiles became different from fleet vehicles such as trains, boats, and other ocean going vessels because automobiles could schedule multiple trips per day while making repeated visits to a logistical hub or supply center. The pace at which trucks could supply goods outstripped anything that was previously known to human civilization and made the delivery of goods possible at scale. Buses developed scheduled times and routes for conveying passengers along certain routes at certain times.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex, which has been a persistent problem since antiquity. Horse cavalry attacking at the wrong time on an ancient Greek battlefield and buses arriving off schedule are different implementations of the same problem spread thousands of years apart. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis. Those costs may include pollution due to emissions, fuel costs, driver costs, costs in time, and others. Current solutions are not only inefficient but wasteful and contribute to cumulative emissions based environmental harm. Optimization is needed to reduce financial, pollution, and time costs in fleet vehicle use and routing.

It is, therefore, one object of this disclosure to provide a user interface that facilitates a routing system which optimizes routes for fleet vehicles. It is another object of this disclosure to provide an optimization scheme that allows vehicles which are already in use or already scheduled for use to complete certain routes in lieu of an under-utilized vehicle completing the routes.

SUMMARY OF THE DISCLOSURE

A system is provided which includes a device associated with one of an administrator user, a ride requestor user, and a provider user. The device may identify to a server computer a route to be reassigned from a first vehicle to a second vehicle among a fleet of vehicles. The server device may include an artificial intelligence engine which compares the route to be reassigned to a plurality of route groups associated with one of the administrator and the ride requestor. The server device may further identify one or more route groups which are able to service the route to be reassigned based on the artificial intelligence engine. The server device may transmit, to the device, a graphical representation of one or more of the plurality of route groups which is proximally available in terms of location and time, as determined by the artificial intelligence engine to service the route to be reassigned. The server device identifies the one or more routes among the plurality of route groups that is proximally available in terms of location and time, as determined by the artificial intelligence engine, to service the route to be reassigned with a color coded indicator. The server device reassigns the route.

A method is provided which includes identifying, based on input provided from a user device associated with one of an administrator user, a ride requestor user, and a provider user to a service device, a route to be reassigned from a first vehicle to a second vehicle among a fleet of vehicles. The server device compares, using an artificial intelligence engine, the route to be reassigned to a plurality of route groups associated with one of the administrator and the ride requestor. The server device identifies one or more route groups which are available to service the route to be reassigned based on the artificial intelligence engine. The server transmits a graphical representation of one or more of the plurality of route groups which is proximally available in terms of location and time as determined by the artificial intelligence engine to service the route to be reassigned. The server identifies the one or more route groups among the plurality of route groups that is proximally available in terms of location and time as determined by the artificial intelligence engine, to service the route to be reassigned with a color coded indicator. The server device reassigns the route to be reassigned to the second vehicle which serves one of the one or more route groups in the plurality of route groups.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 5 illustrates an exemplary embodiment of a user interface for resolving a conflict in a reassignment of a route to another vehicle.

DETAILED DESCRIPTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
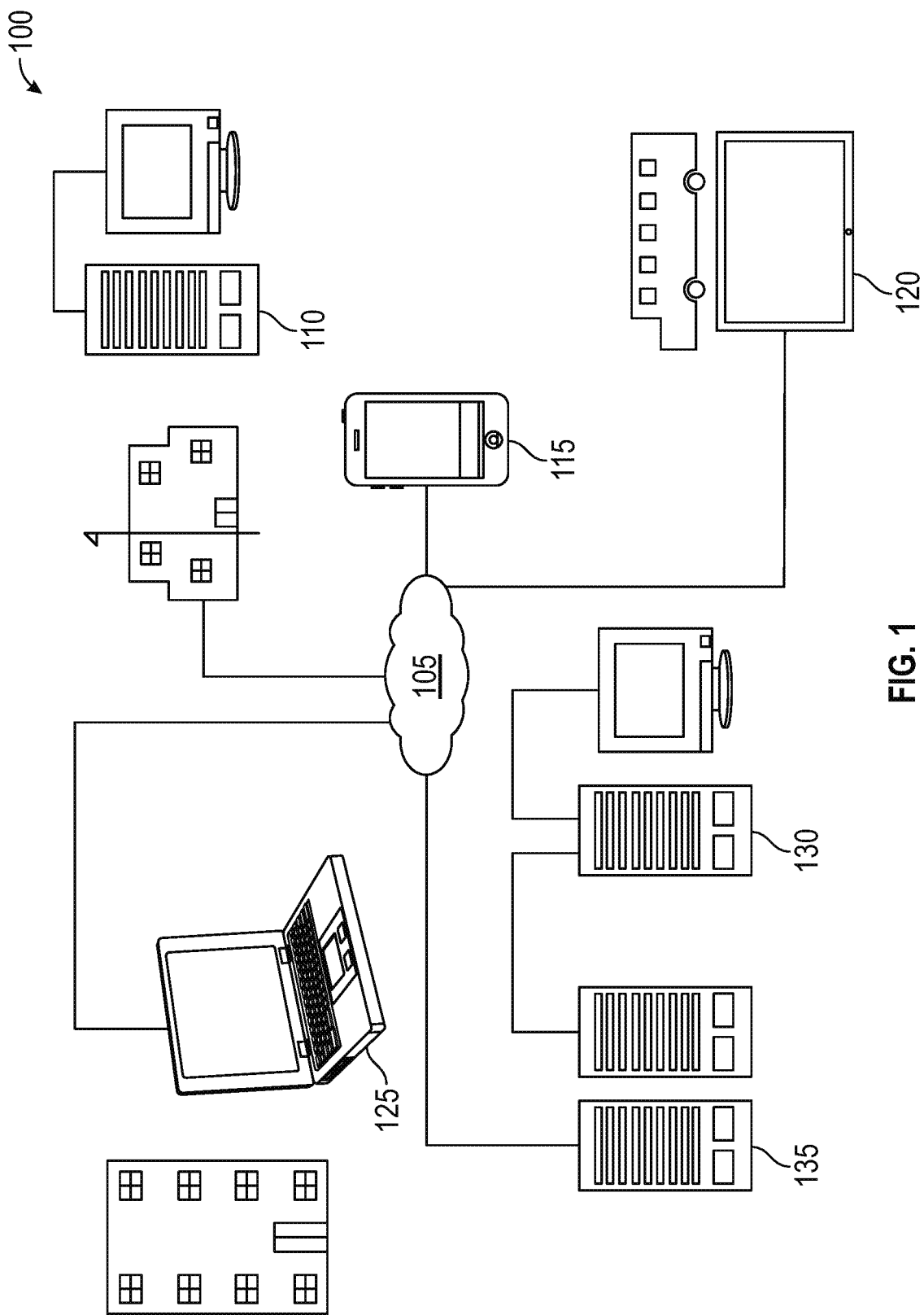
FIG. 1 illustrates box diagram of a fleet routing system.

FIG. 1 illustrates a box diagram of a fleet routing system 100. Fleet routing system may be implemented by use of a communications network 105 such as the Internet, which facilitates the exchange of information between various devices within fleet routing system 100. Fleet routing system may be used with any fleet but is described with respect to a fleet of school buses. The techniques disclosed herein may be used to deliver passengers or goods with little or no modification. Fleet routing system 100 may be implemented between a ride requestor device, such as a school device 110 (and/or an administration level device 125, which will be discussed below) and a user device 115, and a driver device 120 associated with a bus driver, for example. Fleet routing system 100 may be implemented by an administrator device 125. A provider may provide the administrator device 125 or the ride requestor device 110 with access to fleet routing system 100 by use of servers 135 and provider device 130. In one implementation, a school district may use administration level device 125 which provides buses to pick up and deliver children to a school and operate in a manner similar to ride requestor device 110. In other embodiments, ride requestor device 110 may be implemented to schedule routing for bus routes for a particular school. In other words, various levels of administration may access and implement fleet routing system 100 according to their particular needs for the delivery of passengers.

At the outset, a provider device 130 may give a ride requestor device 110 or an administrator level device 125 access to fleet routing system 100 by servers 135 to create bus routing for a particular school district or school as appropriate. Servers 135 may provide a user interface to ride requestor device 110 or an administrator level device 125 to create routes for each child in the district or school as appropriate. For example, a profile may be created for each child in the district or school as appropriate to be stored in non-volatile non-transitory storage media, which includes a home address for each child. In response, fleet routing system 100 may determine a distance between identified stops and a travel time between each of those identified stops to determine both a single bus route and a number of buses required for a necessary number of routes. For example, based on a standard bus configuration, a school bus may transport 80 seated students. However, due to time and distance constraints, a certain bus may only be able to pick up 45 students at identified stops. The identified stops may be based on ensuring a child does not cross a road or lives within a certain distance of the identified stop. If one location is heavily populated with children who need to board a school bus, optimized routing may determine that since more children are boarding per identified stop, that particular school bus may need less time to complete an assigned route. In one embodiment, fleet routing system 100 may optimize routes based on the shortest time on the road for each bus, based on minimal fuel usage across the fleet, based on minimal emissions across the fleet, based on or any other basis that is meaningful to the school or community served by the school.

Once the routes are generated with children assigned to a particular bus, server 135 may transmit bus information to user device 115 by fleet routing system 100. Bus information may include bus stop information for picking up a child and a time for pick up at the bus stop. User device 115 may be associated with the child bus rider or with a parent of the child bus rider. User device 115 may be implemented as separate devices where one device is associated with the child rider and another device is associated with a parent, guardian, or other supervisor of a child. When the school bus is operating, a real time location may be provided to user device 115 so that the child and child supervisor may identify where the bus is currently located. A child or child supervisor may use user device 115 to create the child profile discussed above by providing information from user device 115 through communications network 105 to server 135.

Further, once the routes are generated, server 135 may transmit individual route information to a bus driver via driver device 120, in fleet routing system 100. Individual route information may be a mandatory bus route for the driver to follow with a stop sequence that is identified along the individual route. Individual route information may include turn by turn instructions with expected drive time duration and distance for the bus driver. Driver device 120 may also detect information from a particular bus drive and provide that information to server 135 through communication network 135. Information provided from driver device 120 may include distance traveled information, fuel use information, pickup duration information, bus stop location information (e.g., information about where the stop is designated versus where the stop actually occurred), speed of travel information (in terms of actual speeding and in terms of slowdowns caused by traffic, construction, or any other road condition), rider verification information, rider disembarking information, and any other information that may be used by server 135 to optimize routing. In one embodiment, driver device 120 may receive an optimized route from server 135 for picking up children based on a home or a school address and/or prior pickup/drop off history locations for children on a particular route. In another embodiment, driver device 120 may further be optimized to prevent U-turns, enforce curbside pickup to avoid children crossing streets. Server 135 may receive information from driver device 120 which it may use to optimize routes based on learning from past driver routes to determine a best path between stops. Server 135 may receive information from driver device 120 which may optimize based on learned roadblocks and driver input to driver device 120 with new information (e.g., a street closure or construction) which causes server 135 to reoptimize the bus route. Server 135 may use information to determine and store driving instructions at the ride route level for a particular bus and driver device 120. Server 135 may track a bus via driver device 135 during a pickup or drop off ride and ensure compliance with the optimized route. If driver device 120 indicates that a bus is not following optimized route information, server 135 may send a message to ride requestor device 110, administrator device 125, or provider device 130 to allow either the ride requestor, the administrator, or the provider to contact the bus driver with route correction instructions.

Based on information received from driver device 120, server device 135 may maintain estimated global positioning system ("GPS") waypoints and an estimated time of arrival ("ETA") information for each ride, which may be constantly updated based on information provided by driver device 120. Driver device 120 may further provide real-time routing, navigation, and path information based on a current location of driver device 120. Routing, navigation, and path information may be displayed on a screen associated with driver device 120. The user may receive, via user device 115, expected vehicle path information on a map displayed on a screen of user device 115. Thus, a user of user device 115 may be able to track bus 120 in real-time and observe where a bus is currently and when a bus will be at a specific stop, which may be identified by waypoints provided to the user from server 135 via user device 115. Any data received from driver device 120 may be stored as historical data which may be used to further optimize bus routing on a permanent or temporary basis depending on road conditions, pickup/drop off requirements, and any other factor identified herein.

Ride requestor device 110, user device 115, driver device 120, administrator device 125, and provider device 130 may be implemented as any electronic device with processing power sufficient to share electronic information back and forth through communications network 105. Examples of ride requestor device 110, user device 115, driver device 120, administrator device 125, and provider device 130 include mobile phones, desktop computers, laptop computers, tablets, game consoles, personal computers, mobile devices, notebook computers, smart watches, and any other digital device that has the processing ability to interact with server 135.

Ride requestor device 110, user device 115, driver device 120, administrator device 125, and provider device 130 may include software and hardware modules that execute computer operations, communicate with communication networks 105 and server 135. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within ride requestor device 110, user device 115, driver device 120, administrator device 125, and provider device 130, are used to connect with server 135.

Server 135 may provide web-based access to fleet routing system 100 (or relevant portions based on which device is associated with a particular function—e.g., a parent using user device 115 may not have permissions to reroute buses) to ride requestor device 110, user device 115, driver device 120, administrator device 125, and provider device 130.

Communication network 105 may be a wired, wireless, or both and facilitate communications in fleet routing system 100. Server 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute optimized routing and communication for web based fleet routing system 100. Server computer 135 may be implemented as one or more actual devices but are collectively referred to as server computer 135 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, processors, control devices transmitters, receivers, antennas, transceivers, input devices, output devices, network interface devices, and other types of components that are apparent to those skilled in the art. These hardware components within one or more server 135 may be used to execute the various methods or algorithms disclosed herein, and interface with ride requestor device 110, user device 115, driver device 120, administrator device 125, and provider device 130.

In one embodiment, ride requestor device 110, user device 115, driver device 120, administrator device 125, and provider device 130 may access server 135 by a communication network 105. In each case, wireless communication network 135 connects ride requestor device 110, user device 115, driver device 120, administrator device 125, and provider device 130 via an internet connection provided by communication network 105. Any suitable internet connection may be implemented for wireless communication network 105 including any wired, wireless, or cellular based connections. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11 g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between, ride requestor device 110, user device 115, driver device 120, administrator device 125, and provider device 130 and server 135.

Figure 2:
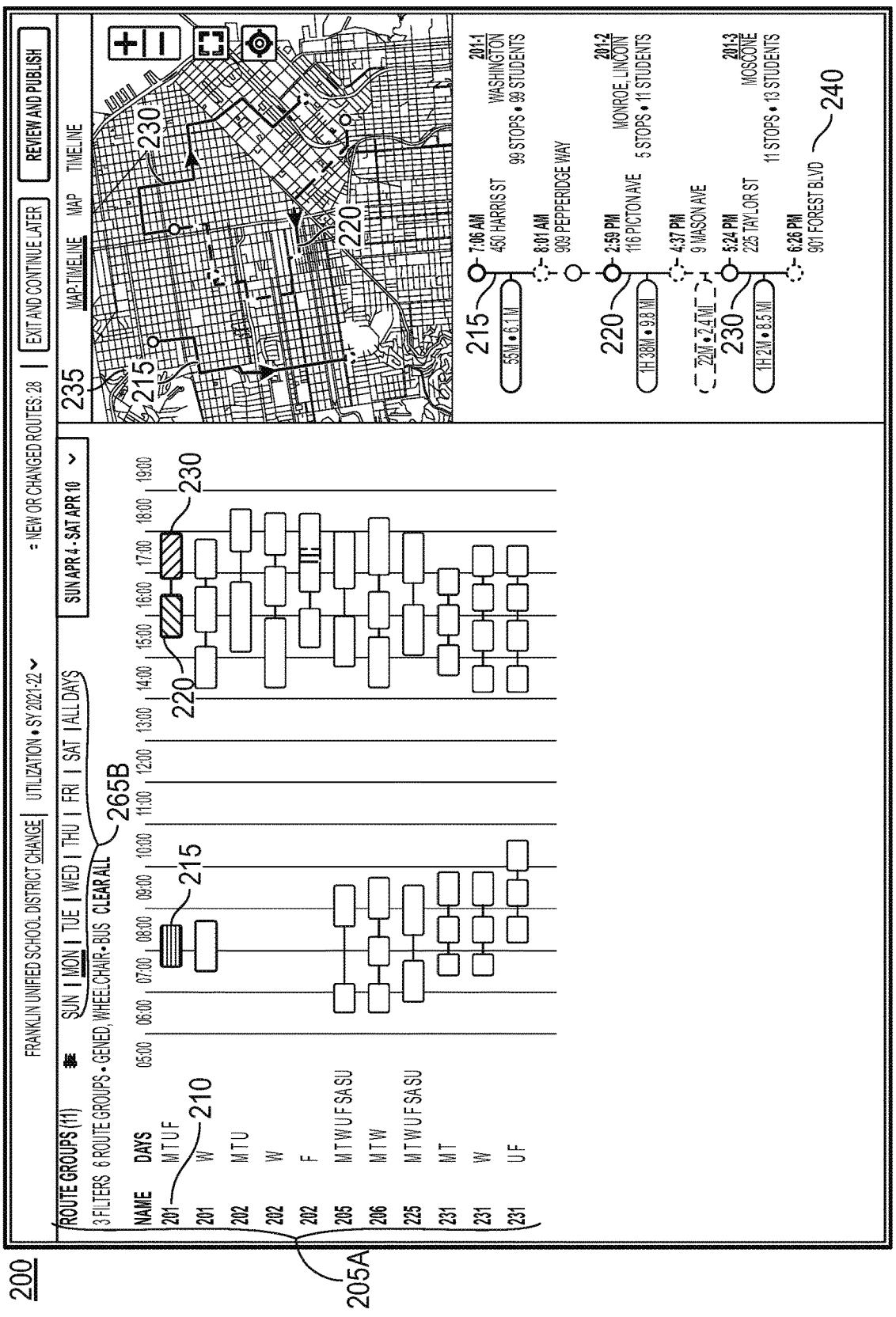
FIG. 2 illustrates an exemplary embodiment of a user interface demonstrating assigned routes for a vehicle.

FIG. 2 illustrates an exemplary embodiment of a user interface 200 demonstrating assigned routes for a vehicle. As shown in FIG. 2, a plurality of route groups 205A are assigned to a particular route day 205B. Each route group 205A may be assigned several individual routes, as will be discussed below. For example, route groups 205A for a particular route day 205B, such as Monday, may include route 201 on Mondays, Tuesdays, Thursdays, and Fridays, while route 201 operates on different routes on Wednesdays. Route 202 may be assigned certain routes on Monday Tuesday, and Thursday while having different routes on both Wednesdays and Fridays. Route 205 may operate on Mondays, Tuesdays, Wednesdays, Thursdays, Fridays, Saturdays, and Sundays with the same route every day. Route 206 may operate for assigned routes on Mondays, Tuesdays, and Wednesdays. Route 225 may operate on Mondays, Tuesdays, Wednesdays, Thursdays, Fridays, Saturdays, and Sundays with the same route every day. Route 231 may operate with certain assigned routes on Mondays and Tuesdays, another set of assigned routes on Wednesdays, and another set of assigned routes on Thursdays and Fridays.

Route 201, identified as element 210, may be used for explanation purposes. Route 201 operates on Mondays, Tuesdays, Thursdays, and Fridays to travel an assigned route 215 from 7:06 AM to 8:01 AM. Route 201 may also be assigned to provide service for route 220, which operates from 2:59 PM to 4:37 PM as well as route 230 which operates from 5:24 PM to 6:26 PM. On Wednesdays, however, route 201 may be assigned to different routes. As shown in FIG. 2, route day 205B is selected as Monday and route 201 is selected as a route to view. However, any one of the routes 210 shown in route group 205A on any particular route day 205A may be similarly shown in map 235 and timeline view 240, as will be discussed below. Here, however, user interface 200 is implemented to show that each one route of route group 210 may be assigned individual routes over certain times for a particular day.

For route 201, routes 215, 220, and 230 may be illustrated on map 235 which may instruct a driver using driver device 120 about the locations of the pickup and drop off locations for the particular route. In one embodiment, routes 215, 220, and 230 may be color coded in both the map 135 and in user interface 200 when route 201 is selected for viewing. For example, during a timed schedule, each route may be assigned a particular color such as route 215 being assigned a blue color during the time schedule, route 220 being assigned a purple color in the time schedule and route 230 being assigned a green color in the time schedule. In map 235, the same colors for each route may be used to illustrate each route in map 235. For example, in map 235, route 215 may also be illustrated as blue, route 220 may also be illustrated as purple, and route 230 may be illustrated as green. It is noted that the colors used for color coding in the time schedule of route group 205A and shown on map 235 are not limited to specific colors. Rather, the colors blue, purple, and green are used for explanatory purposes. However, a first color for a first route may be used to identify the same route in a map view 235, while other colors for other routes may be similarly used to identify the same other routes in a map view, such as map 235. Timeline view 240 may use these same colors for illustrating the timeline of the various routes assigned to route 201.

Timeline view 240 may provide detailed information about each individual route. For example, route 215 may be identified as route 201-1 and illustrate the number of students and stops for that particular route. Route 215 begins at 7:06 AM at 450 Harris street and travels for a duration of 55 minutes across 6.1 miles to 909 Pepperidge Way at 801. The next route, route 220 identified as 201-2 identifies the number of stops and students to be picked up and dropped off. Route 220 begins at 2:59 PM at 116 Picton Avenue and travels for a duration of 1 hour and 38 minutes across 9.8 miles to 9 Mason Avenue by 4:37 PM. The next route 230, identified as 201-3 may begin at 5:24 PM at 225 Taylor St. and continue over a duration over 1 hour and 2 minutes across 8.5 miles to 901 Forest Blvd at 6:26 PM. Timeline view 240 may also provide bus travel information between routes 215, 220, and 230 to provide an indication of travel time and distance between a previous route stop location and a next route start location.

Figure 3:
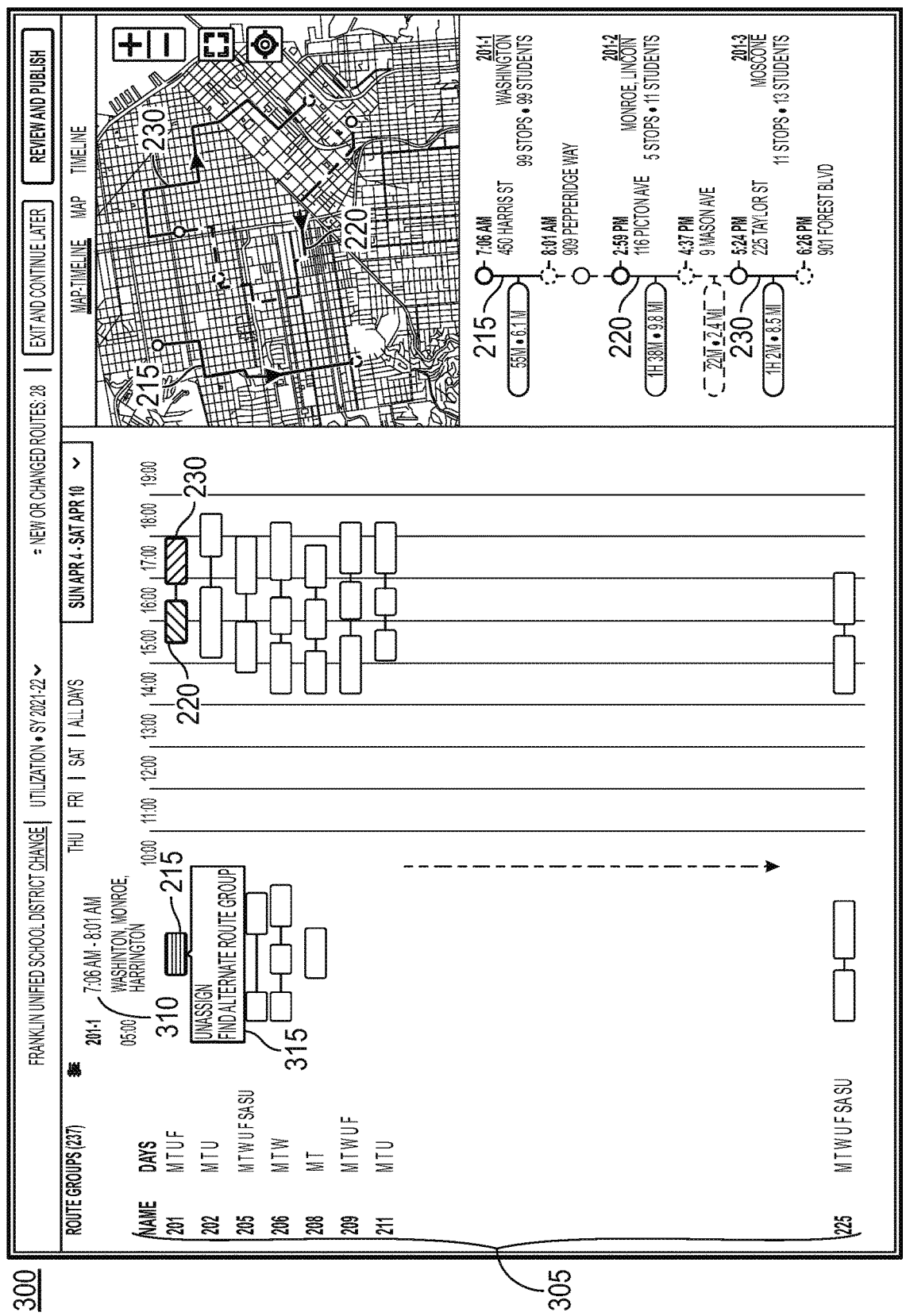
FIG. 3 illustrates an exemplary embodiment of a user interface for requesting a route stacking function.

FIG. 3 illustrates an exemplary embodiment of a user interface 300 for requesting a route stacking function. User interface 300 may be similar in implementation and description to user interface 200 shown in FIG. 2. For example, a plurality of route groups 205A are assigned to a particular route day 205B. Each route group 205A may be assigned several individual routes, as will be discussed below. For example, route groups 205A for a particular route day 205B, such as Monday, may include route 201 on Mondays, Tuesdays, Thursdays, and Fridays, while route 201 operates on different routes on Wednesdays. Routes 202, 205, 206, 208, 209, 211 . . . to 225 are shown in user interface 300.

As previously discussed, route 201, identified as element 210, may be used for explanation purposes. Route 201 operates on Mondays, Tuesdays, Thursdays, and Fridays to travel an assigned route 215 from 7:06 AM to 8:01 AM. Route 201 may also be assigned to provide service for route 220, which operates from 2:59 PM to 4:37 PM as well as route 230 which operates from 5:24 PM to 6:26 PM. On Wednesdays, however, route 201 may be assigned to different routes. As shown in FIG. 3, a user, such as an administrator user, a provider user, and/or a ride requestor may, through administrator device 125, ride requestor device 110, or provider device 130, interact with user interface 300 to request a route stacking operation from fleet routing system 100 via server 135. For example, the administrator/provider/ride requestor user may identify a route or a district to select via drop down menu 310. Once the correct district or route is selected, a user may interact with route 215 within route group 210 (e.g., route 201) and have the option to request that server 135 unassign the route from route group 210 or find an alternate route group in a menu 315. Unassigning route 201-1 means that the route identified as 201-1 would no longer be part of route group 210 and could be assigned to another one of the plurality of route groups 205A. Alternatively, finding an alternate route group, may cause server 135 to search through available route groups 205A to find a time within one of the plurality of route groups 205 during which a vehicle is not allocated to service a particular route while simultaneously ensuring that a new route (e.g., route 201-1) can be serviced by the vehicle in terms of time and distance of travel between routes already assigned to the vehicle, as will be discussed in more detail below.

As shown in FIG. 3, route day 205B is selected as Monday and route 201 is selected as a route to view. However, any one of the routes 210 shown in route group 205A on any particular route day 205A may be similarly shown in map 235 and timeline view 240, as will be discussed below. Here, however, user interface 200 is implemented to show that each one of route group 210 may be assigned individual routes over certain times for a particular day.

For route 201, routes 215, 220, and 230 may be illustrated on map 235 which may instruct a driver using driver device 120 about the locations of the pickup and drop off locations for the particular route. In one embodiment, routes 215, 220, and 230 may be color coded in both the map 135 and in user interface 200 when route 201 is selected for viewing. For example, during a timed schedule, each route may be assigned a particular color such as route 215 being assigned a blue color during the time schedule, route 220 being assigned a purple color in the time schedule and route 230 being assigned a green color in the time schedule. In map 235, the same colors for each route may be used to illustrate each route in map 235. For example, in map 235, route 215 may also be illustrated as blue, route 220 may also be illustrated as purple, and route 230 may be illustrated as green. It is noted that the colors used for color coding in the time schedule of route group 205A and shown on map 235 are not limited to specific colors. Rather, the colors blue, purple, and green are used for explanatory purposes. However, a first color for a first route may be used to identify the same route in a map view 235, while other colors for other routes may be similarly used to identify the same other routes in a map view, such as map 235. Timeline view 240 may use these same colors for illustrating the timeline of the various routes assigned to route 201.

Timeline view 240 may provide detailed information about each individual route. For example, route 215 may be identified as route 201-1 and illustrate the number of students and stops for that particular route. Route 215 begins at 7:06 AM at 450 Harris Street and travels for a duration of 55 minutes across 6.1 miles to 909 Pepperidge Way at 801. The next route, route 220 identified as 201-2 identifies the number of stops and students to be picked up and dropped off. Route 220 begins at 2:59 PM at 116 Picton Avenue and travels for a duration of 1 hour and 38 minutes across 9.8 miles to 9 Mason Avenue by 4:37 PM. The next route 230, identified as 201-3 may begin at 5:24 PM at 225 Taylor St. and continue over a duration over 1 hour and 2 minutes across 8.5 miles to 901 Forest Blvd at 6:26 PM. Timeline view 240 may also provide bus travel information between routes 215, 220, and 230 to provide an indication of travel time and distance between a previous route stop and a next route start.

Figure 4:
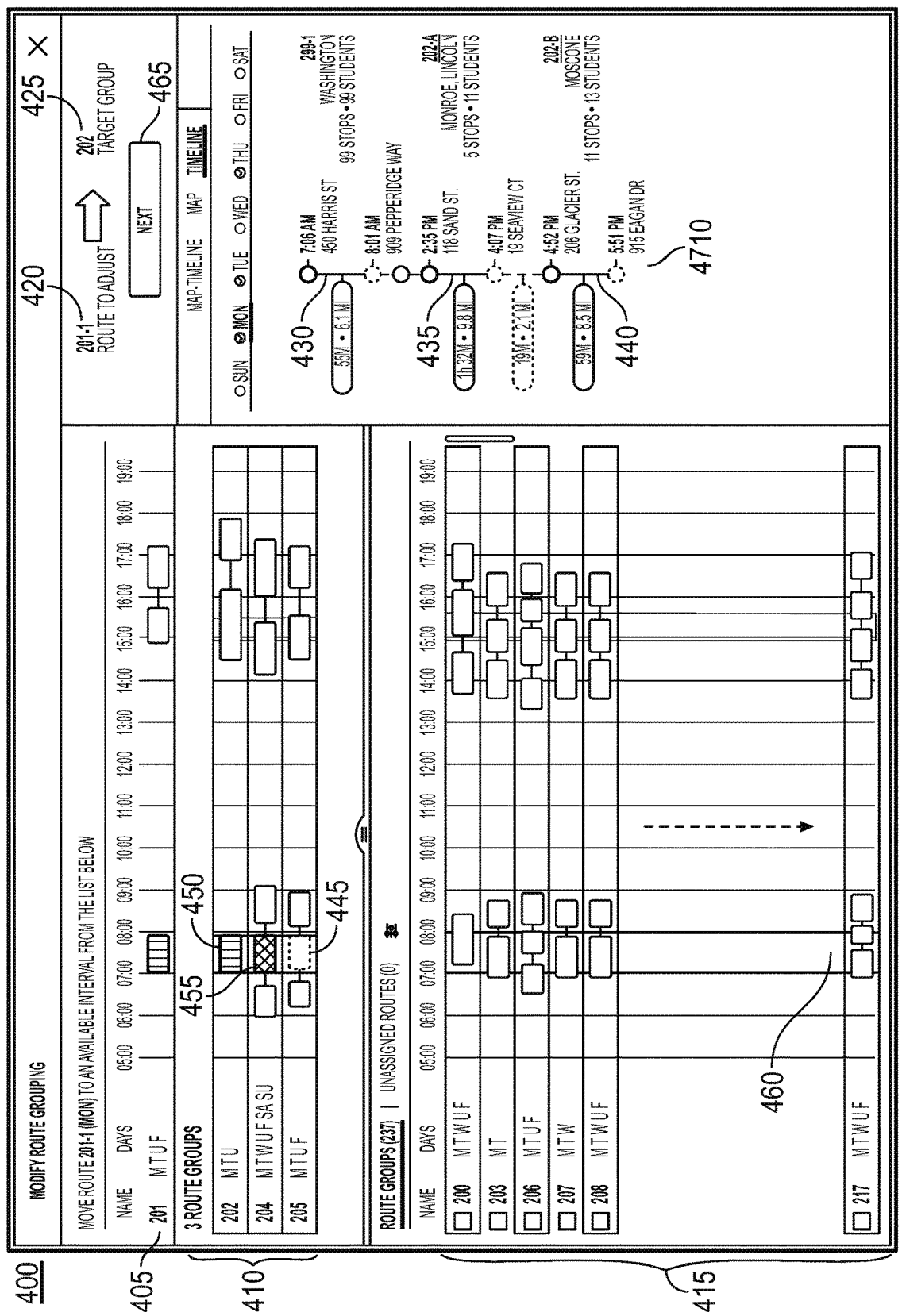
FIG. 4 illustrates an exemplary embodiment of a user interface for providing a route stacking function.

FIG. 4 illustrates an exemplary embodiment of a user interface 400 for providing a route stacking function. In response to a user selecting "find alternative route group" in menu 315, user interface 400 may be provided. Server 135 may use an artificial intelligence engine and machine learning techniques to search through the plurality of route groups 205A to identify potential route groups which may be able to service route 201-1. Server 135 may further use an artificial intelligence engine to determine both a time necessary to service a route (e.g., between 7:06 AM and 8:01 AM) while also determining travel time necessary between routes already assigned to a particular vehicle in identifying an optimized vehicle for providing service to route 201-1. In other words, server 135 may utilize an artificial intelligence engine to review the schedules and distances between the plurality of route groups 205A to identify which vehicle, if any, is both proximate enough and unencumbered enough by other previously assigned routes to service route 201-1. User interface 400 illustrates an example of identifying potential route groups which can accept reassignment of a particular route, such as route 201-1.

As shown in FIG. 4, user interface 400 includes an identification interface 405 of a route to be reassigned. User interface 400 further includes an alternate route group interface 410 which is the result of server 135 using the artificial intelligence engine to identify potential route groups to which route 201-1 could potentially be assigned. As shown in user interface 400, alternate route group interface 410, server 135 has identified three alternative routes, 202, 204, and 205 which could potentially also service route 201-1. For example, route group 202 is available on Mondays, Tuesdays, and Thursdays. Route indicator 450 is shown to graphically represent the potential change to route 202. Route group 204 is available on Monday, Tuesday, Wednesday, Thursday, Friday, Saturday, and Sunday to service route 201-1 between other previously assigned routes, as shown in alternate route group interface 410. Route indicator 455 is shown to graphically represent the potential change to route 204. Route group 205 is available on Mondays, Tuesdays, Thursdays, and Fridays to service route 201-1 between other previously assigned routes, as shown in alternate route group interface 410. Route indicator 445 is shown to graphically represent the potential change to route 205. An administrator/provider/ride requestor user may select a particular route group for assignment of route group 201-1. In this manner, a vehicle that is in use can prevent another vehicle from being put into use which optimizes services in that certain vehicles may need maintenance less often, rides are being provided in an efficient manner, costs are reduced by elimination of duplicative routes, and vehicles may service the routes in a faster manner.

Route indicator 450, route indicator 455, and route indicator 445 may be color coded, to show which of the alternate routes is most appropriate for servicing a particular route. For example, server 135 may determine that route group 202 may be available based on location (e.g., proximity to the start location of the route) and time (e.g., proximity to the start location of the route with enough time to arrive at the start location on time). Route indicator 450 may be color coded green, for example, to show that no potential conflict is likely, and that route group 202 may adequately service route 201-1. Similarly, server 135 may determine that route group 204 may be available based on location (e.g., proximity to the start location of the route) and time (e.g., proximity to the start location of the route with enough time to arrive at the start location on time while also conducting a drop off and traveling to the next start location for the next route on time). Route indicator 455 may be color coded green, for example to show that no potential conflict is likely, and that route group 204 may adequately service route 201-1 while also being able to service a subsequent route assigned to group 204. Server 135 may determine that route group 205 may technically be available based on location (e.g., proximity to the start location of the route) and time (e.g., proximity to the start location of the route with enough time to arrive at the start location on time while also conducting a drop off and traveling to the next start location for the next route on time). However, based on one or more known factors or historical information obtained through driver device 120, server 135 may identify route 205 as being technically possible while unadvisable due to the proximity in time of the commencement of another route, as shown in alternate route group interface 410. In this case, route indicator 445 may be color coded orange to indicate to a user that a route is possible but inadvisable due to the proximity in time of a subsequent route. An administrator/provider/ride requestor user may then select a route group from alternate route group interface 410 for assignment of route 201-1.

User interface 400 may further include route group interface 415 which may provide a visual representation of all route groups available to that particular entity, such as a school district. An indicator, 460 may illustrate the requested timeframe for route 201-1 and visually show that each of the route groups in route group interface 415 are otherwise engaged servicing other routes during the time which route 201-1 is to be serviced.

When an administrator/provider/ride requestor user selects one of the route groups in alternate route group interface 410, such as route 202, user interface 400 may provide adjustment indicator 420 of the previous route 201-1 to be adjusted and provide target indicator 425 of the route group to which route 201-1 will be assigned. User interface 400 may further provide an assignment button 465 which may cause server 135 to formally reassign route 201-1 to route group 202.

User interface 400 may further provide timeline view 470 for route group 202 including route 201-1. For example, a new route (e.g., formerly route 201-1) begins at 7:06 AM at 450 Harris Street and travels for a duration of 55 minutes across 6.1 miles to 909 Pepperidge Way at 801. The next route, route 430 identified as 202-A identifies the number of stops and students to be picked up and dropped off. Route 435, identified as 202-A, begins at 2:59 PM at 118 Sand St. and travels for a duration of 1 hour and 38 minutes across 9.8 miles to 19 Seaview Ct. by 4:37 PM. The next route 440, identified as 202-B may begin at 5:24 PM at 206 Glacier St. and continue over a duration over 1 hour and 2 minutes across 8.5 miles to 915 Eagan Dr. at 6:26 PM. Timeline view 470 may also provide bus travel information between routes 430, 436, and 440 to provide an indication of travel time and distance between a previous route stop and a next route start.

Figure 5:
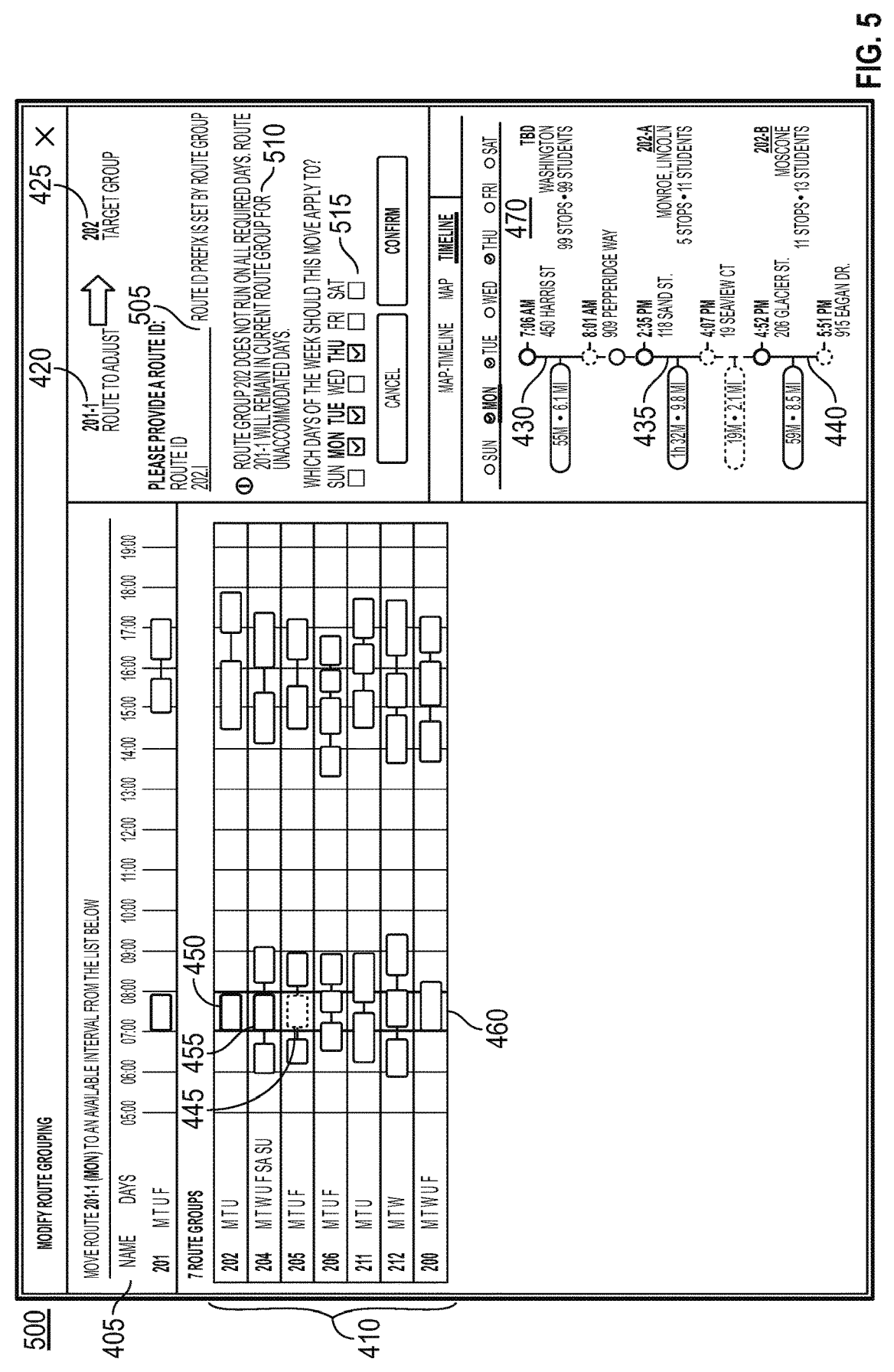

FIG. 5 illustrates an exemplary embodiment of a user interface 500 for resolving a conflict in a reassignment of a route to another vehicle. User interface 500 includes an identification interface 405 of a route to be reassigned. User interface 500 further includes an alternate route group interface 410 which is the result of server 135 using the artificial intelligence engine to identify potential route groups to which route 201-1 could potentially be assigned. As shown in FIG. 5, alternate route group interface 410 includes all routes whether possible or not, while still including route indicators 445, 455, and 450 for routes 205, 204, and 202, respectively. User interface 500 further includes adjustment indicator 420 of the previous route 201-1 to be adjusted and provide target indicator 425 of the route group to which route 201-1 will be assigned.

As shown in FIG. 5, user interface 500 has been caused by server 135 to request a new route identification 505. Server 135 may also determine that a conflict exists because route group 202 does not operate on a certain day, for example, and provide a warning 510 identifying that group 202 does not run on all requested days. User interface 500 may also provide a solution to the conflict along with warning 510 and provide a selector interface 515 for resolving the conflict. In the case of user interface 500, selector interface 515 provides a list of days which can be selected for route 201-1. In this case, Monday can be de-selected in selector interface 515 to resolve the conflict. For this example, route group 201 may continue to service route 201-1 on Mondays though route group 202 would service route 201-1. However, rides on three other days, Tuesday, Thursday, and Friday, would be serviced by route group 202. This minimizes the use of the vehicle associated with route group 201, saving maintenance, costs for paying drivers, and increasing efficiency of the fleet of vehicles.

User interface 500 may further provide timeline view 470 for route group 202 including route 201-1. For example, a new route (e.g., formerly route 201-1) begins on all assigned days, with the exception of Monday, at 7:06 AM at 450 Harris Street and travels for a duration of 55 minutes across 6.1 miles to 909 Pepperidge Way at 801. The next route, route 430 identified as 202-A identifies the number of stops and students to be picked up and dropped off. Route 435, identified as 202-A, begins at 2:59 PM at 118 Sand St. and travels for a duration of 1 hour and 38 minutes across 9.8 miles to 19 Seaview Ct. by 4:37 PM. The next route 440, identified as 202-B may begin at 5:24 PM at 206 Glacier St. and continue over a duration over 1 hour and 2 minutes across 8.5 miles to 915 Eagan Dr. at 6:26 PM. Timeline view 470 may also provide bus travel information between routes 430, 436, and 440 to provide an indication of travel time and distance between a previous route stop and a next route start.

Figure 6:
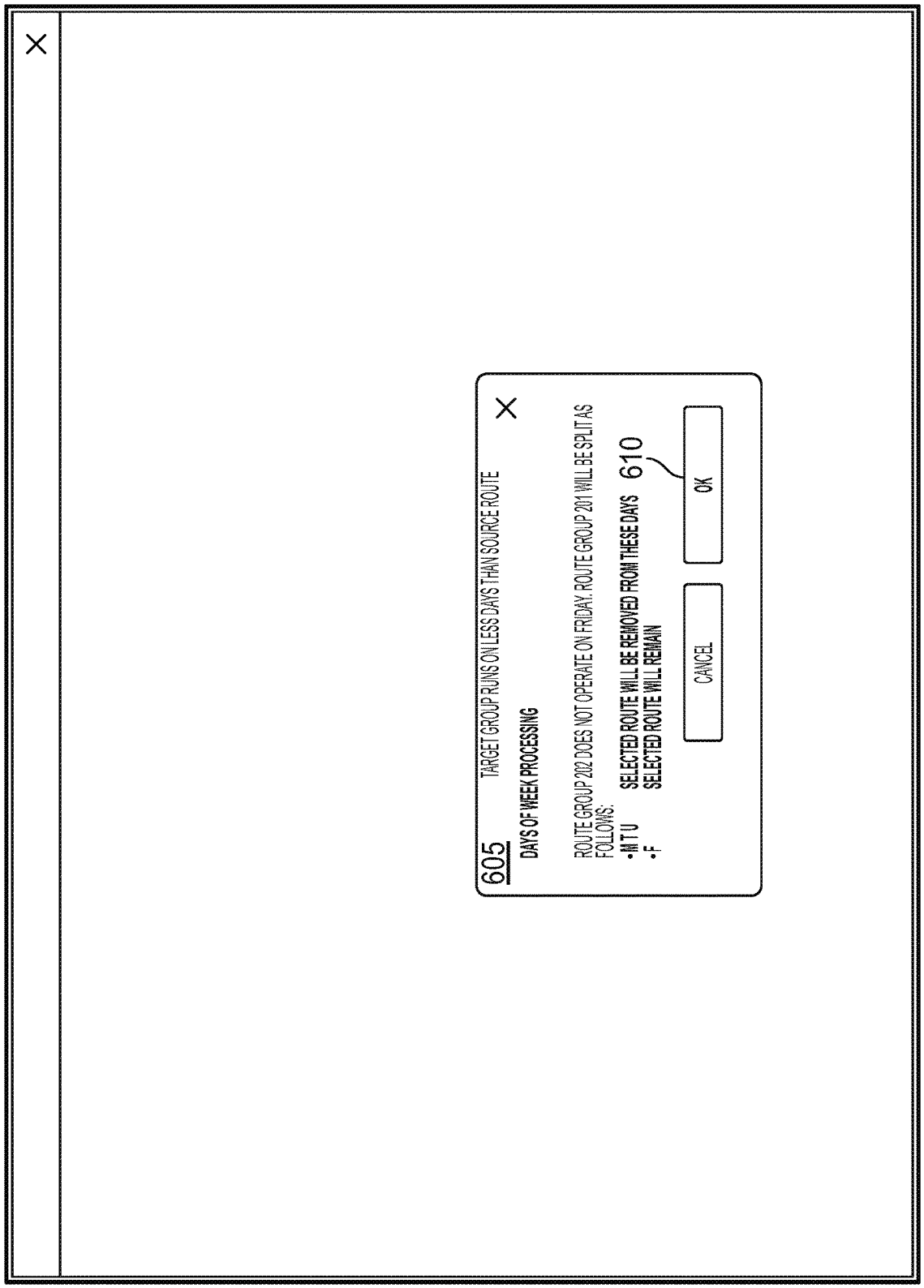
FIG. 6 illustrates an exemplary embodiment of a user interface identifying the resolution to the conflict.

FIG. 6 illustrates an exemplary embodiment of a user interface 600 identifying the resolution to the conflict shown in user interface 500. As shown, a notification interface 605 may be caused to be displayed by server 135 to notify an administrator/provider/route requestor user about how the conflict was resolved and give the administrator/provider/route requestor user control buttons 610 to either accept or refuse the routing changes identified in notification interface 605.

Figure 7:
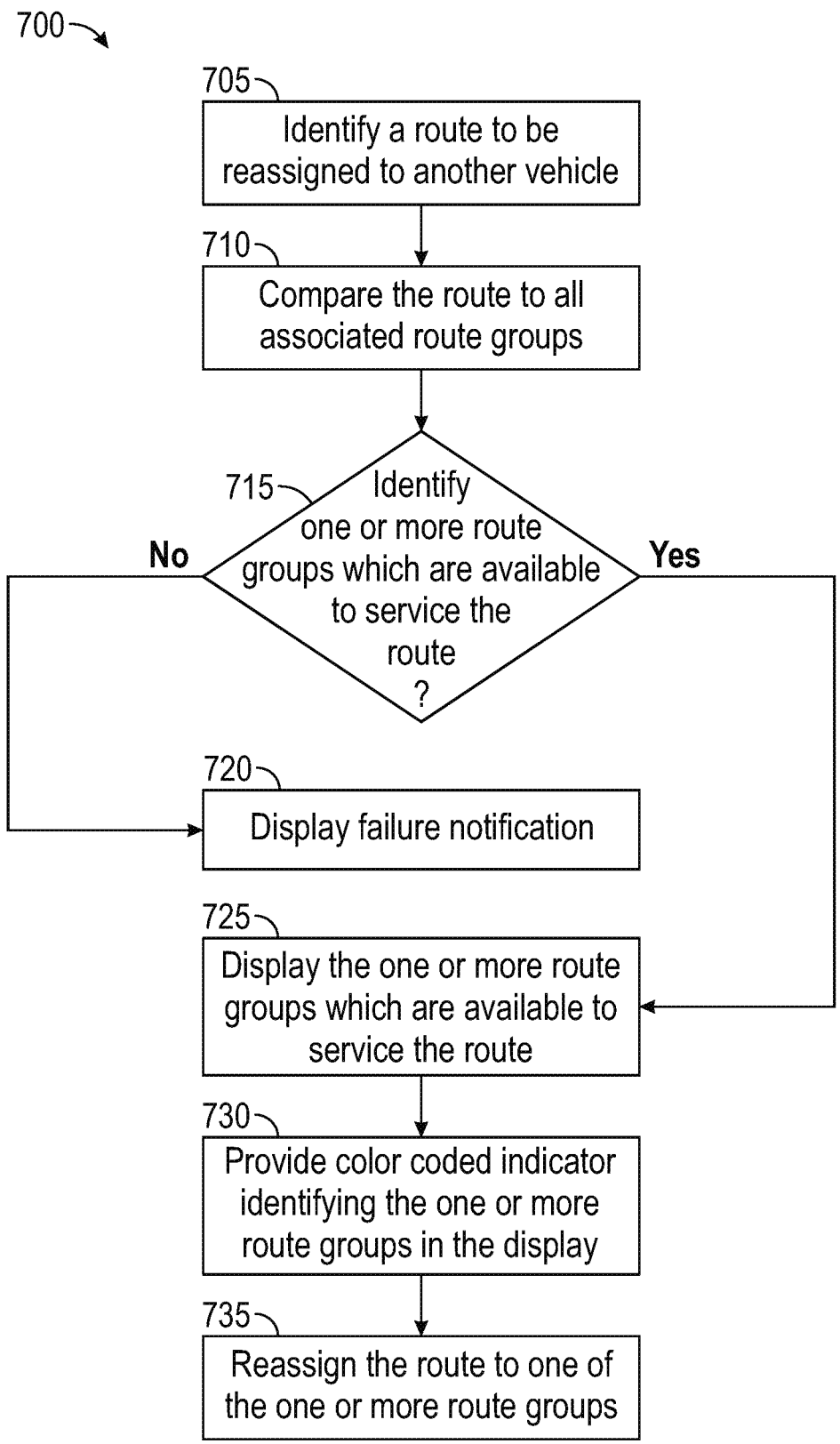
FIG. 7 illustrates a method for providing a route stacking function.

FIG. 7 illustrates a method 700 for providing a route stacking function. Method 700 begins at step 705 where a route to be reassigned to another vehicle may be identified in, for example, a display associated with administrator device 125, provider device 130 and/or ride requestor device 110. For example, a route, such as route 201-1 may be identified for reassignment, as discussed above. At step 710, a server device 135 may compare the route to all associated route groups for a particular entity which owns a fleet of vehicles, each one of the vehicles in the fleet of vehicles being associated with a particular route group, such as a school district and a fleet of school buses. Server device 135 may compare the route to all associated route groups provided within fleet routing system 110 using an artificial intelligence engine provided by or associated with server device 135 using machine learning techniques to identify one or more route groups (e.g., vehicles) which are available to service the route in step 715. If no route groups exist (715—No) that are able to service the route, method 720 may end by server 135 causing administrator device 125, provider device 130 and/or ride requestor device 110 to display a failure notification.

In the event that server 135 does identify one or more route groups able to service the route at step 715 (715—Yes), server 135 may cause administrator device 125, provider device 130 and/or ride requestor device 110 to display the one or more route groups which are available to service the route at step 725. In this case, for example, at step 725, server 135 may provide identifications of the one or more route groups, such as route group 202, that are available to service route 201-1 and cause the one or more route groups to be displayed on administrator device 125, provider device 130 and/or ride requestor device 110. At step 730, server 135 may further provide color coded indicators identifying the one or more route groups in the display that are available to service a route. For example, at step 730, server 135 may provide indicators such as indicators 445, 450, and 455 to identify the availability of a route group, such as route group 202, to service the route, such as route 201-1. At step 735, server 135 may reassign the route to one of the one or more route groups. For example, server 135 may receive confirmation from a user via control button 465, for example, that the identified route (e.g., route 201-1) is to be reassigned to one of the identified one or more route groups (e.g., route group 202) and reassign the route accordingly.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:
   a server device comprising an artificial intelligence engine, one or more processors, and a memory storing instructions that, when executed by the one or more processors, cause the one or more processors to perform steps comprising:
   receiving, a request from a user device associated with one of an administrator user, a ride requestor user, and a provider user, for a route to be reassigned from a first vehicle among a fleet of vehicles, wherein each one of a plurality of routes serviced by the fleet of vehicles, and a map that includes the plurality of routes are displayed via a graphical user interface, and wherein the plurality of routes, including the route to be reassigned from the first vehicle, are scheduled and repeating routes;
   receiving real time data from vehicle devices associated with one or more vehicles in the fleet of vehicles;
   retrieving historical data previously received from the vehicle devices servicing the plurality of routes in past, wherein the artificial intelligence engine is iteratively trained with the historical data by learning from the historical data associated with servicing the plurality of routes in the past;
   comparing, using the artificial intelligence engine trained with historical data, information about the route to be reassigned to information about a plurality of route groups associated with one or more vehicles within the fleet of vehicles, wherein the information includes the real time data and the historical data,
   optimizing, by the artificial intelligence engine trained with historical data, assignment of the route to one or more other vehicles within the fleet based on learning from the historical data, optimizing including:
      determining, by the artificial intelligence engine trained with historical data, based on the comparing of the real time data and the historical data with machine learning from previous assignments of the route, the one or more other vehicles within the fleet of vehicles which are available to more efficiently and optimally service the route to be reassigned relative to the previous assignments of the route, wherein the one or more other vehicles service one or more available route groups that is proximally available in terms of location and time to optimally service the route to be reassigned;
   updating the graphical user interface to display a graphical representation of the one or more available route groups as determined by the artificial intelligence engine, wherein the graphical representation includes the route to be reassigned added to each one of the one or more available route groups and identified with a visual cue as an advisability indicator as determined by the artificial intelligence engine, wherein one or more unavailable route groups unable to accommodate the route to be reassigned are identified with a separate visual cue on the graphical user interface to prevent selection;

receiving, by the server device, a selected route group among the one or more available route groups, wherein the selected route group is serviced by a second vehicle among the one or more other vehicles within the fleet of vehicles which are available to more efficiently and optimally service the route to be reassigned based on the artificial intelligence engine and relative to the previous assignments of the route;

unassigning the route to be reassigned from the first vehicle; and reassigning the route to be reassigned to the second vehicle which services the selected route group.

2. The system of claim 1, further comprising a timeline view interface provided to the user device by the server device, the timeline view interface displaying each route in a route group for the route to be reassigned.

3. The system of claim 2, further comprising a timeline view interface provided to the user device by the server device, the timeline view interface displaying each route in the plurality of route groups.

4. The system of claim 3, wherein each route in the route group in the timeline view interface is color coded to identify the route and each route in the one of the one or more route groups is color coded in the timeline view interface.

5. The system of claim 1, wherein the graphical representation of each route in the plurality of route groups is displayed with a start time and stop time of each route in the plurality of route groups.

6. The system of claim 1, wherein the graphical representation of each route in the route group is selectable to be identified as the route to be reassigned.

7. A method, comprising:

receiving, by a server device, a request from a user device associated with one of an administrator user, a ride requestor user, and a provider user for a route to be reassigned from a first vehicle among a fleet of vehicles wherein each one of a plurality of routes serviced by the fleet of vehicles, and a map that includes the plurality of routes are displayed via a graphical user interface, and wherein the plurality of routes, including the route to be reassigned from the first vehicle, are scheduled and repeating routes;

receiving, by the server device, real time data from vehicle devices associated with one or more vehicles in the fleet of vehicles;

retrieving, by the server device, historical data previously received from the vehicle devices servicing the plurality of routes in past, wherein an artificial intelligence engine is iteratively trained with the historical data by learning from the historical data associated with servicing the plurality of routes in the past;

comparing, by the server device using the artificial intelligence engine trained with historical data, information about the route to be reassigned to information about a plurality of route groups associated with one or more vehicles within the fleet of vehicles, wherein the information includes the real time data and the historical data;

optimizing, by the server device using the artificial intelligence engine trained with historical data, assignment of the route to one or more other vehicles within the fleet based on learning from the historical data, optimizing including:

determining, by the artificial intelligence engine trained with historical data, based on the comparing of the real time data and the historical data with machine learning from previous assignments of the route, the one or more other vehicles within the fleet of vehicles which are available to more efficiently and optimally service the route to be reassigned relative to the previous assignments of the route, wherein the one or more other vehicles service one or more available route groups that is proximally available in terms of location and time to optimally service the route to be reassigned;

updating the graphical user interface to display a graphical representation of the one or more available route groups as determined by the artificial intelligence engine, wherein the graphical representation includes the route to be reassigned added to each one of the one or more of the plurality of route groups and identified with a visual cue as an advisability indicator as determined by the artificial intelligence engine, wherein one or more unavailable route groups unable to accommodate the route to be reassigned are identified with a separate visual cue on the graphical user interface to prevent selection;

receiving, by the server device, a selected route group among the one or more available route groups, wherein the selected route group is serviced by a second vehicle among the one or more other vehicles within the fleet of vehicles which are available to more efficiently and optimally service the route to be reassigned based on the artificial intelligence engine and relative to the previous assignments of the route;

unassigning, by the server device, the route to be reassigned from the first vehicle; and reassigning, by the server device, the route to be reassigned to the second vehicle which services the selected route group.

8. The method of claim 7, further comprising a timeline view interface provided to the user device by the server device, the timeline view interface displaying each route in a route group for the route to be reassigned.

9. The method of claim 8, further comprising a timeline view interface provided to the user device by the server device, the timeline view interface displaying each route in the plurality of route groups.

10. The method of claim 9, wherein each route in the route group in the timeline view interface is color coded to identify the route and each route in the one of the one or more route groups is color coded in the timeline view interface.

11. The method of 7, wherein the graphical representation of each route in the plurality of route groups is displayed with a start time and a stop time of each route in the plurality of route groups.

12. The method of claim 7, wherein the graphical representation of each route in the route group is selectable to be identified as the route to be reassigned.

* * * * *